(12) United States Patent
Keffer

(10) Patent No.: US 9,566,556 B2
(45) Date of Patent: Feb. 14, 2017

(54) ADJUSTABLE VENTURI FLUID MIXING METHOD

(71) Applicant: Crossroads Machine, Inc., Chesapeake, VA (US)

(72) Inventor: Gary E Keffer, Chesapeake, VA (US)

(73) Assignee: CROSSROADS MACHINE, INC., Chesapeake, VA (US)

(*) Notice: Subject to any disclaimer, the term of this patent is extended or adjusted under 35 U.S.C. 154(b) by 86 days.

(21) Appl. No.: 14/705,174

(22) Filed: May 6, 2015

(65) Prior Publication Data

US 2015/0238911 A1    Aug. 27, 2015

Related U.S. Application Data

(63) Continuation of application No. 14/091,398, filed on Nov. 27, 2013, now Pat. No. 9,038,590.

(51) Int. Cl.
*F02B 75/18* (2006.01)
*B01F 5/04* (2006.01)
*F02M 35/10* (2006.01)

(52) U.S. Cl.
CPC ...... *B01F 5/0413* (2013.01); *F02M 35/10262* (2013.01); *F02M 35/10314* (2013.01); *Y02T 10/146* (2013.01)

(58) Field of Classification Search
CPC ............ B01F 5/0413; F02M 35/10262; F02M 35/10314
USPC ........................................ 123/184.21–184.61
See application file for complete search history.

(56) References Cited

U.S. PATENT DOCUMENTS

| | | | | |
|---|---|---|---|---|
| 5,628,287 | A * | 5/1997 | Brackett | F02M 35/1222 |
| | | | | 123/184.55 |
| 9,038,590 | B2 * | 5/2015 | Keffer | B01F 5/0413 |
| | | | | 123/184.53 |
| 2002/0163089 | A1 * | 11/2002 | La Crosse | B01F 3/0446 |
| | | | | 261/76 |
| 2006/0060173 | A1 * | 3/2006 | Wei | F02B 29/0425 |
| | | | | 123/568.17 |
| 2007/0152355 | A1 * | 7/2007 | Hartley | B01F 5/0413 |
| | | | | 261/76 |

* cited by examiner

*Primary Examiner* — Marguerite McMahon
(74) *Attorney, Agent, or Firm* — Peter J. Van Bergen

(57) ABSTRACT

A method of mixing two fluids uses three open-ended tubular sections assembled to define a mixing valve. An axial relationship between two of the tubular sections is defined by the third tubular section. A first fluid is introduced into an annular channel defined by the tubular sections. A flow of a second fluid is introduced along a flow path through the tubular sections. The first fluid is drawn into the flow of the second fluid via holes linking the annular channel to the flow path.

3 Claims, 5 Drawing Sheets

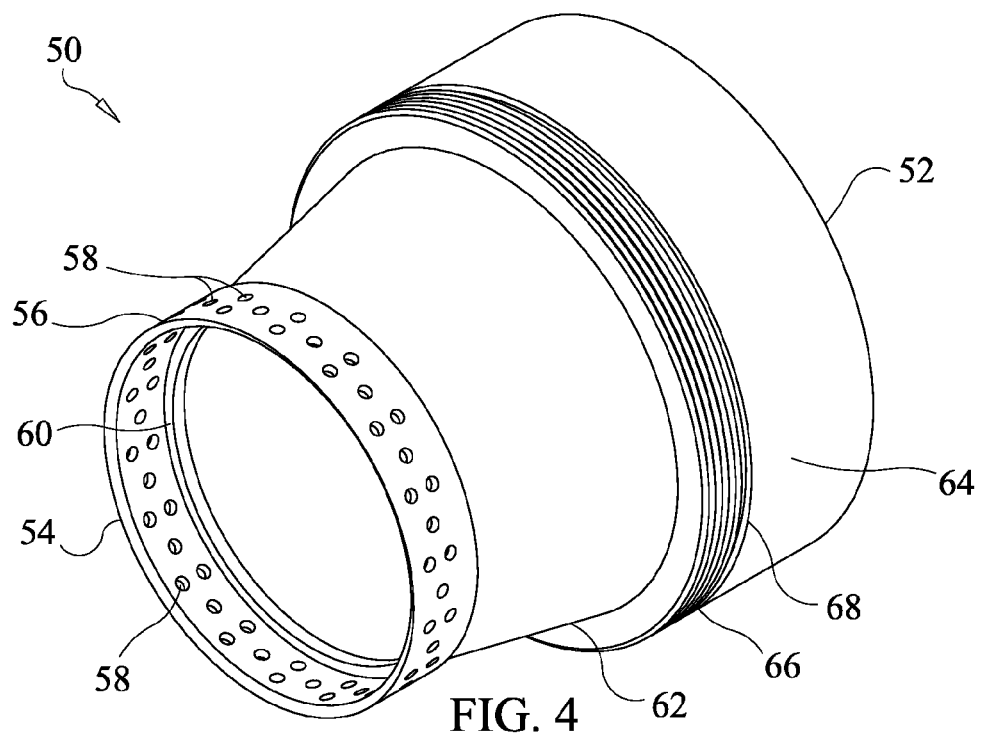
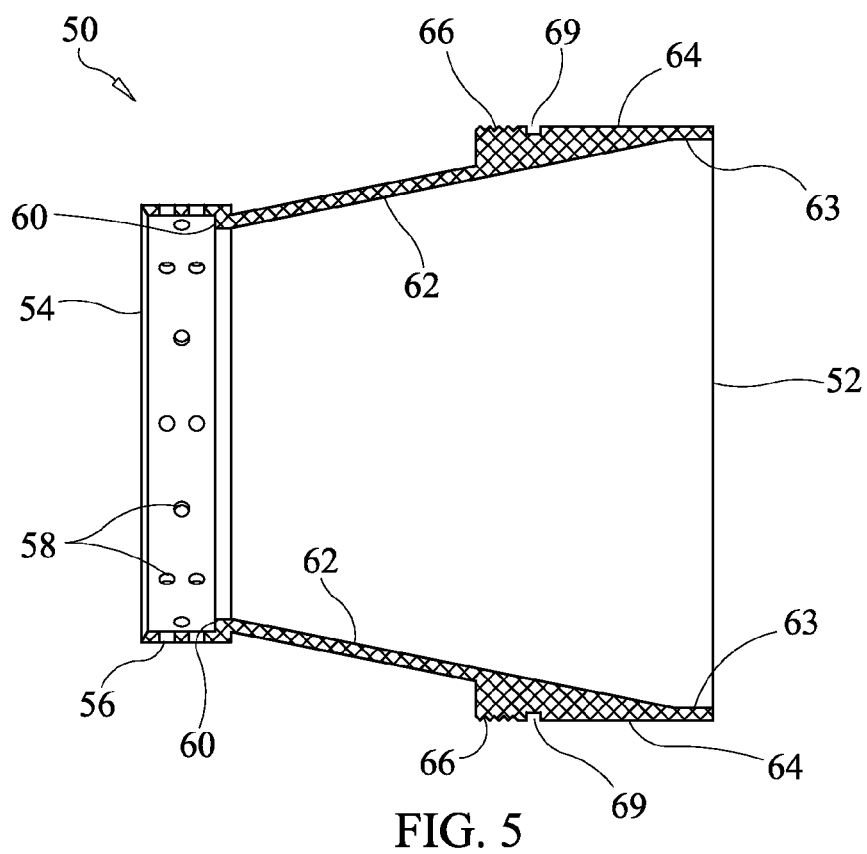

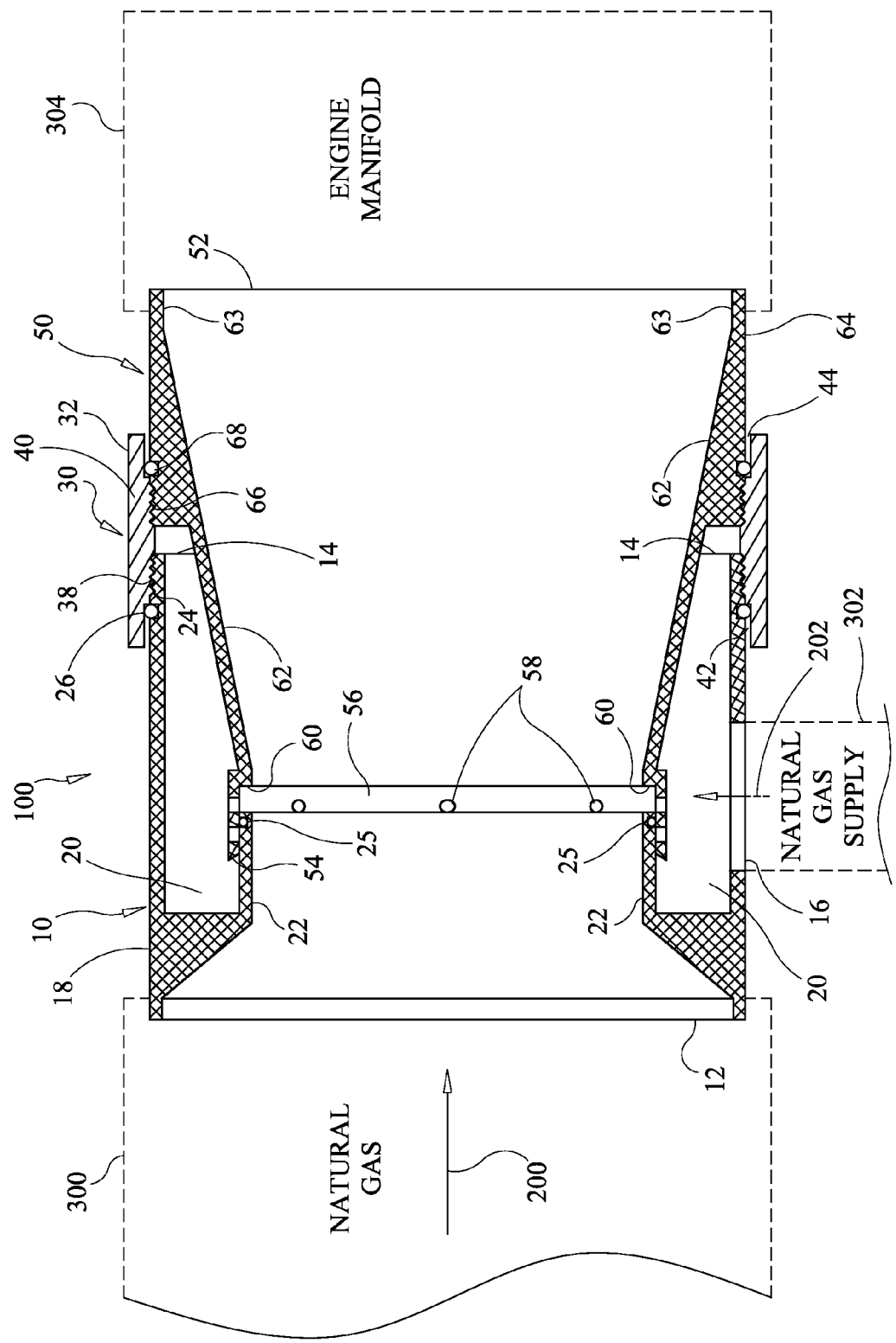

ADJUSTABLE VENTURI FLUID MIXING METHOD

CROSS-REFERENCE TO RELATED APPLICATIONS

This application is a continuation application of U.S. patent application Ser. No. 14/091,398, filed on Nov. 27, 2013.

FIELD OF THE INVENTION

The invention relates generally to mixing valves, and more particularly to a venturi mixing valve assembly that precisely and adjustably mixes two fluids.

BACKGROUND OF THE INVENTION

Diesel engines configured for bi-fuel operation utilize an air and natural gas mixture along with diesel fuel. The advantages associated with bi-fuel operation include reduced diesel fuel consumption and reduced noxious emissions.

Conversion of a conventional diesel engine for bi-fuel operation is readily and typically accomplished by coupling a natural gas supply line to diesel engine's air intake line. To control the amount of natural gas introduced into the air intake, some type of conventional valve is disposed in the gas supply line. While a simple valve is preferred for robustness and cost, these valves do not typically offer the kind of precise adjustability required for efficient bi-fuel operation at a variety of diesel engine speeds.

SUMMARY OF THE INVENTION

Accordingly, it is an object of the present invention to provide a mixing valve for use in controlling an air and natural gas mixture provided to a bi-fuel diesel engine.

Another object of the present invention is to provide a mixing valve that allows for precise adjustment of the amount of natural gas introduced into an air and natural gas mixture being provided to a bi-fuel diesel engine.

Other objects and advantages of the present invention will become more obvious hereinafter in the specification and drawings.

In accordance with the present invention, a method of mixing two fluids uses an open-ended first tubular section having a sleeve defined therein wherein a flow path is defined through the sleeve and an annular channel open on one end thereof is defined between the sleeve and an inner surface of the first tubular section. Also included is an open-ended second tubular section defining an annular region with a plurality of holes and a venturi region coupled to the annular region. The annular region circumscribes at least a portion of the sleeve of the first tubular section and is sealed to the sleeve. An open-ended third tubular section is sealed to an outer surface of the first tubular section and to an outer surface of the second tubular section such that (i) the annular channel is enclosed, (ii) an axial relationship between the first tubular section and second tubular section is defined by the third tubular section, and (iii) at least a portion of the holes define a fluid path between the annular channel and the flow path through the first tubular section. A first fluid is introduced into the annular channel, and a flow of a second fluid is introduced along the flow path through the first tubular section. As a result, the first fluid is drawn into the flow of the second fluid via the portion of the holes defining the fluid path.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 4 is an isolated perspective view of the venturi portion of the valve assembly;

FIG. 5 is an isolated cross-sectional view of the venturi portion of the valve assembly;

FIG. 6 is a cross-sectional view of the valve assembly in its assembled configuration with the adjustment ring thereof positioned for the introduction of a gas at the venturi portion of the valve assembly;

DETAILED DESCRIPTION OF THE INVENTION

Figure 1:
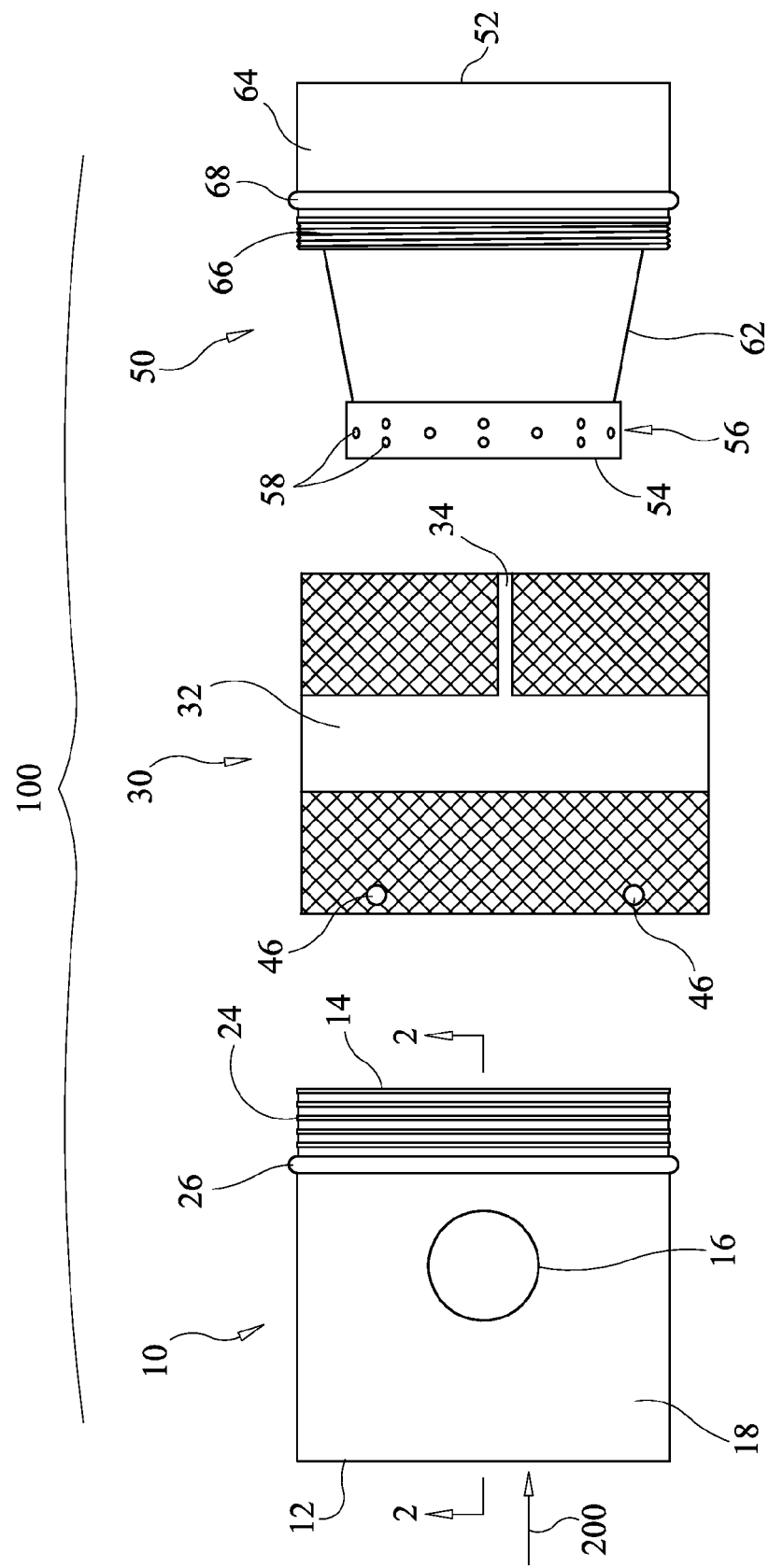
FIG. 1 is an exploded side view of an adjustable venturi mixing valve assembly in accordance with an embodiment of the present invention.
Figure 2:
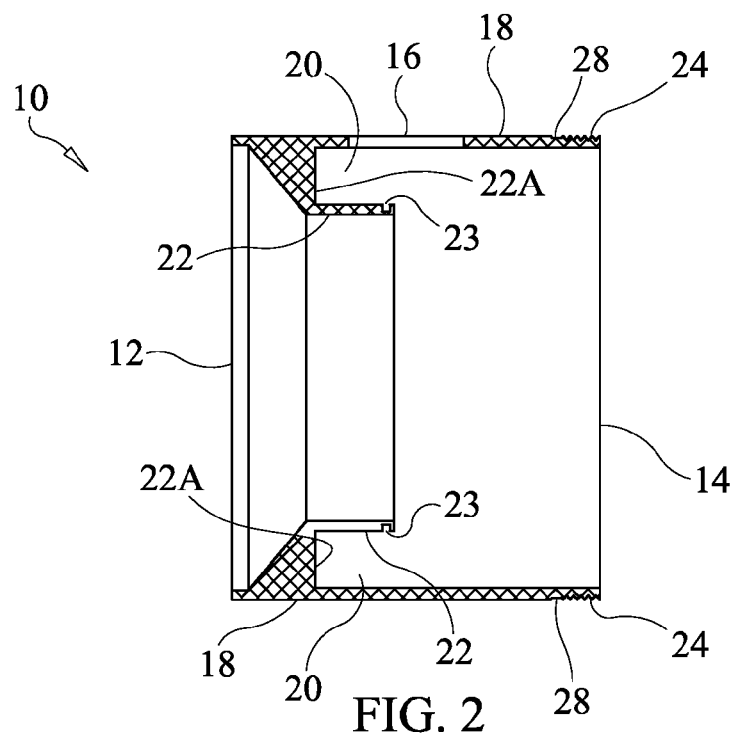
FIG. 2 is an isolated cross-sectional view of the air and natural gas intake portion of the valve assembly taken along line 2-2 in FIG. 1.
Figure 3:
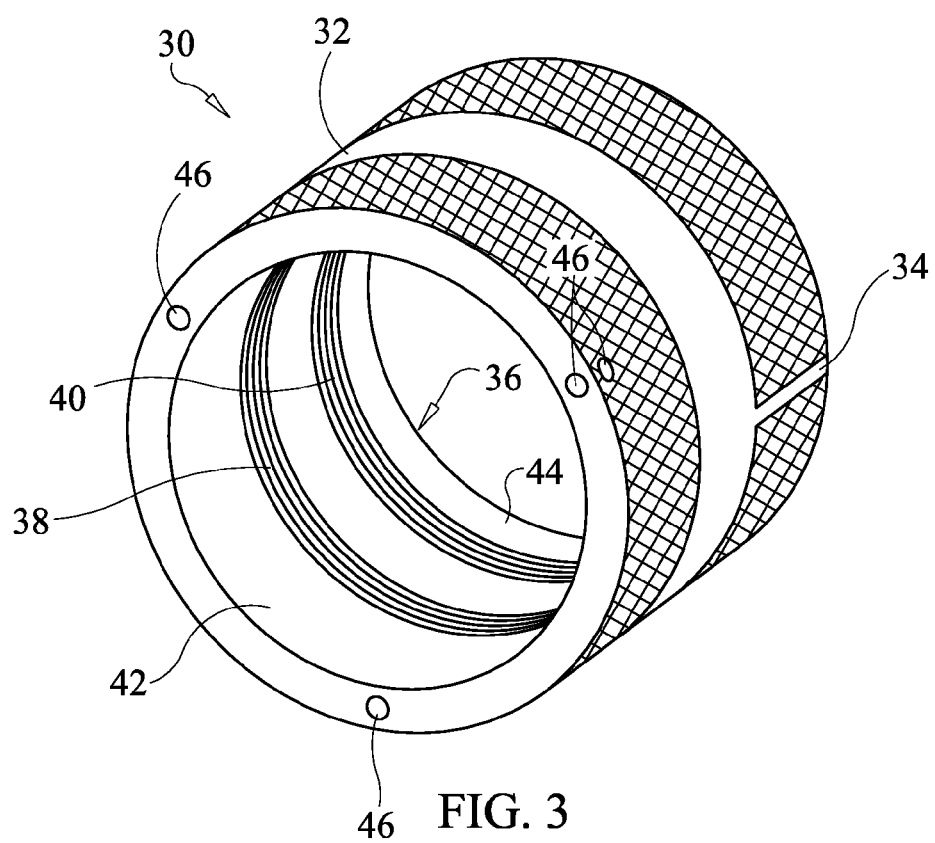
FIG. 3 is an isolated perspective view of the valve assembly's adjustment ring.

Referring now to the drawings, simultaneous reference will be made to FIGS. 1-6 in order to explain the structure and advantages of the adjustable venturi mixing valve assembly in accordance with an embodiment of the present invention. By way of example, the valve assembly will be explained for its use in a diesel engine configured for bi-fuel operation. However, it is to be understood that the valve assembly could be used in any fluid mixing situation where two diverse fluids/gases need to be mixed together precisely and in adjustable concentrations.

The entirety of the valve assembly of the present invention will be referenced generally by the numeral 100. Valve assembly 100 is an open-ended, flow through valve that includes three open-ended tubular sections, i.e., an intake portion 10, an adjustment ring 30, and a venturi portion 50. For purposes of this description, intake portion 10 serves as an air and natural gas intake when valve assembly 100 is incorporated into a bi-fuel diesel engine as will be explained later below with reference to FIG. 6.

Intake portion 10 has an open outboard end 12 that receives a flow of air indicated by arrow 200 in FIG. 1, and has an open inboard end 14 that will be threadably coupled to one side of adjustment ring 30. A natural gas supply line (not shown) is coupled to a natural gas inlet 16 formed in an outer wall 18 of intake portion 10. The shape, size and/or configuration of inlet 16 is not a limitation of the present invention. Inlet 16 is in fluid communication with an open-end annular channel 20 (FIG. 2) defined within intake portion 10. More specifically, annular channel 20 is defined between an inner surface 18A of outer wall 18 and an inner cylindrical sleeve 22 concentrically defined within outer wall 18. Opposite its open end, sleeve 22 terminates in an annular flange 22A sealed to or integrated with inside surface 18A of outer wall 18. An annular slot 23 can be provided in the outer surface of sleeve 22 to receive an o-ring seal (not shown) for reasons that will be explained later herein.

Outer wall 18 is threaded on its outside surface (as indicated by reference numeral 24) at inboard end 14. An o-ring seal 26 is provided at the outside surface of outer wall 18 for sealing engagement with an inside surface of adjustment ring 30 as will be explained later below. O-ring seal 26 can rest in an annular slot 28 (shown in FIG. 2) defined in outer wall 18.

Adjustment ring 30 is an open-ended tubular ring having an outer surface 32 that can be partially (as shown) or completely knurled to facilitate the gripping thereof. Other surface finishes or devices could be coupled to outer surface 32 to facilitate the gripping thereof without departing from the scope of the present invention. Outer surface 32 can also include indicia and/or indexing mark(s) 34 for alignment with indexing mark(s) and/or indicia (not shown) on one or both of the outer surfaces of intake portion 10 and venturi portion 50. Such indicia and/or indexing mark(s) can be calibrated to indicate the concentration of natural gas being supplied into air flow 200 based on the relative position of adjustment ring 30.

The inner surface 36 of adjustment ring 30 (FIG. 3) defines two spaced-apart and independent threaded regions 38 and 40 sandwiched by two smooth annular regions 42 and 44. Threaded regions 38 and 40 define threads that oppose one another, i.e., one is right hand threaded and the other is left hand threaded. Threaded region 38 is designed to threadably cooperate with threads 24 on intake portion 10. Threaded region 40 is designed to threadably cooperate with threads 66 on venturi portion 50. Smooth annular regions 42 and 44 are designed to form a sliding seal fit with o-ring seals 26 and 68, respectively, when valve assembly 100 is fully assembled.

For reasons that will be explained further below, one end (or both ends) of adjustment ring 30 can be provided with through holes 46. Each hole 46 extends from an end of adjustment ring 30 to outer surface 32. A line (not shown) such as a wire, a wire tie, a strap, etc., can be fed through hole(s) 46 and "tied" to a nearby stationary fixture to lock adjustment ring 30 in a desired position. However and as will be explained later below, the locking of adjustment ring 30 can be accomplished in other ways without departing from the scope of the present invention.

For the illustrated example, venturi portion 50 serves as an air and natural gas mixer. Venturi portion 50 includes an open outboard end 52 and an open inboard end 54 that serves as both the inlet for air flow 200 and the inlet for a flow 202 (FIG. 6) of natural gas. More specifically, inboard end 54 is the end of an annular sleeve region 56 that defines a plurality of through holes 58 (e.g., circular holes as shown, slots, etc.) distributed around region 56. The size, shape, and number of holes 58 are not limitations of the present invention. The interior of region 56 is sized to circumscribe cylindrical sleeve 22 and form a sliding but sealed fit therewith, e.g., via an o-ring 25 fitted in annular slot 23 (FIG. 2) when valve assembly 100 is assembled as shown in FIG. 6. The interior of region 56 terminates in an annular ledge 60 sized in correspondence with the open end of sleeve 22 such that ledge 60 serves as a travel stop. At least a portion of the interior portion of venturi region 50 between ledge 60 and outboard end 52 is shaped to define a venturi 62 that is readily seen in FIGS. 5 and 6. The particular features of venturi 62 (e.g., its length, diameter, angular taper, etc.) are not limitations of the present invention.

In the illustrated embodiment, venturi 62 terminates in and is integrated with an inside surface 63 of the outer wall 64 of venturi portion 50. Outer wall 64 is threaded on its outside surface as indicated by reference numeral 66. An o-ring seal 68 is provided at the outside surface of outer wall 64 for sealing engagement with smooth annular region 44 of adjustment ring 30 (FIG. 6). O-ring seal 68 can rest in an annular slot 69 (visible in FIG. 5) defined in outer wall 64.

In use, valve assembly 100 is assembled as shown in FIG. 6. For the illustrated embodiment, an air supply 300 is coupled/sealed to outboard end 12, a natural gas supply 302 is coupled/sealed to inlet 16, and outboard end 52 is coupled/sealed to an engine manifold 304 of a bi-fuel diesel engine. Each such coupling/sealing can be accomplished in a variety of ways without departing from the scope of the present invention. Valve assembly 100 allows the natural gas in supply 302 to be maintained at zero pressure as air flow 200 pulls natural gas from annular channel 20 (through any of exposed holes 58) into venturi 62.

With valve assembly 100 so installed and assembled, adjustment ring 30 can be rotated to adjust the amount of natural gas drawn into the air and natural gas mixture. More specifically, intake portion 10 and venturi portion 50 are fixed in terms of any rotational movement about their longitudinal axes, while an opposing thread operation is defined between threads 24/threaded region 38 and threads 66/threaded region 40 (i.e., one is threaded for left handed operation and the other is threaded for right hand operation). Accordingly, rotation of ring 30 in one direction draws intake portion 10 and venturi portion 50 axially towards one another, while rotation of ring 30 in the opposite direction causes intake portion 10 and venturi portion 50 to move axially away from one another. Note that the amount of axial movement is relatively small and can generally be supported by the mechanical arrangement of air supply 300 and gas supply 302. Ring 30 is sized/configured such that o-ring seals 26 and 68 remain sealingly engaged with smooth annular regions 42 and 44, respectively, at all rotational positions of ring 30. Ring 30 is sized/configured to control the operating range of valve assembly 100. That is, ring 30 is configured to provide for axial movement of intake portion 10 and venturi portion 50 that, in turn, provides a range of exposure of holes 58 to annular channel 20. The range of exposure could extend from the complete exposure of all holes 58 to the complete closure of all holes 58 to annular channel 20 (e.g., when ledge 60 abuts the open end of sleeve 22). The total number of completely (and/or partially) exposed holes 58 defines a total flow area in fluid communication with air flow 200 moving through intake portion 10.

By way of example, FIG. 6 illustrates valve assembly 100 with ring 30 positioned such that some of holes 58 are exposed to annular channel 20. As long as some of (or portions of) holes 58 are exposed to annular channel 20, natural gas 202 is drawn into channel 20 and through the exposed portions of holes 58, and then into venturi 62 as air flow 200 moves through venturi 62. That is, the increase in velocity and pressure drop associated with movement through venturi 62 will draw natural gas 202 through exposed ones of holes 58. Accordingly, natural gas 202 can be maintained at zero pressure. The concentration of natural gas 202 is precisely and readily adjusted by simply rotating ring 30 to thereby expose more/less of holes 58. The resulting precise mixture of air and gas flows through venturi 62 to outlet 52 for admittance to engine manifold 304.

Figure 7:
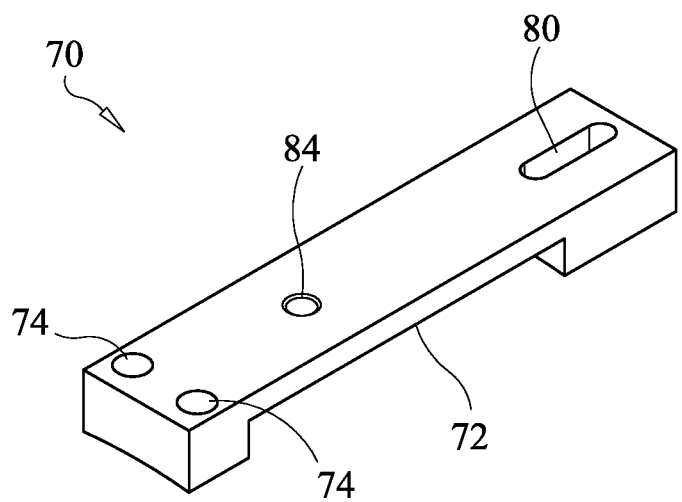
FIG. 7 is perspective view of a locking bar that can be used to fix the position of the adjustment ring in accordance with another embodiment of the present invention.
Figure 8:
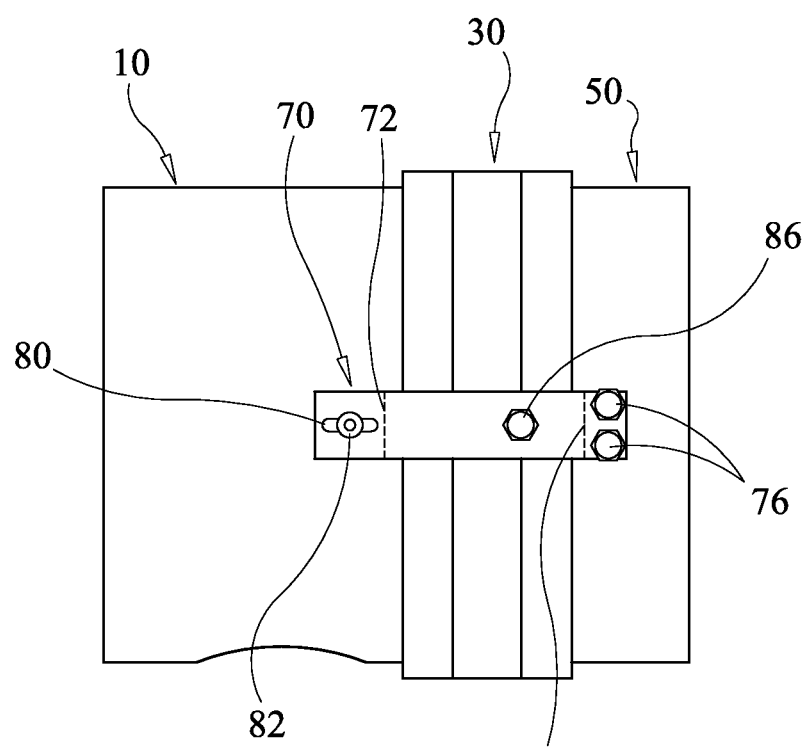
FIG. 8 is a plan view of the valve assembly with the locking bar coupled thereto.

As mentioned above, a variety of devices/mechanisms could be employed to lock adjustment ring 30 in place to thereby maintain a desired air/gas mixture. For example and as shown in FIGS. 7 and 8, the locking of adjustment ring 30 can be accomplished with a locking bar 70 that attaches to intake portion 10 and venturi portion 50. More specifically, locking bar 70 is a rigid bar that defines a channel 72 that fits over ring 30. The length of channel 72 allows for axial travel of ring 30 during the rotation thereof on portions 10 and 50. Locking bar 70 has two holes 74 that receive screws/bolts 76 for threaded coupling to mating holes (not shown) in venturi portion 50. A slotted hole 80 receives a screw/bolt 82 for threaded coupling to a mating hole (not shown) in intake portion 10. During adjustment/rotation of ring 30, channel 72 provides for axial travel of ring 30. Once the desired rotational position of ring 30 (i.e., indicative of a desired mixture of air and gas) is achieved, a clamping screw/bolt 86 passing through a threaded hole 84 in locking bar 70 is tightened such that the end of screw/bolt 86 bears against ring 30 to lock it in place.

The advantages of the present invention are numerous. The mixing valve assembly provides a simple and precise approach to mixing two gases. Since there is no air or gas pressure on the adjustment ring, precise adjustments in gas concentrations are readily achieved.

Although the invention has been described relative to specific embodiments thereof, there are numerous variations and modifications that will be readily apparent to those skilled in the art in light of the above teachings. It is therefore to be understood that the invention may be practiced other than as specifically described.

What is claimed as new and desired to be secured by Letters Patent of the United States is:

1. A method of mixing two fluids, comprising the steps of:
providing an open-ended first tubular section having a sleeve defined therein wherein a flow path is defined through said sleeve and an annular channel open on one end thereof is defined between said sleeve and an inner surface of said first tubular section;
providing an open-ended second tubular section defining an annular region with a plurality of holes and a venturi region coupled to said annular region, said annular region circumscribing at least a portion of said sleeve of said first tubular section and sealed to said sleeve;
sealing an open-ended third tubular section to an outer surface of said first tubular section and to an outer surface of said second tubular section, wherein said annular channel is enclosed, wherein an axial relationship between said first tubular section and said second tubular section is defined by said third tubular section, and wherein at least a portion of said holes define a fluid path between said annular channel and said flow path;
introducing a first fluid into said annular channel; and
introducing a flow of a second fluid along said flow path, wherein said first fluid is drawn into said flow of said second fluid through said portion of said holes defining said fluid path.

2. A method according to claim 1, wherein said first fluid in said annular channel is at about zero pressure.

3. A method according to claim 1, further comprising the step of adjusting said axial relationship to adjust an amount of said first fluid being drawn into said flow of said second fluid.

\* \* \* \* \*